United States Patent

Schulz, Jr.

[15] 3,681,976
[45] Aug. 8, 1972

[54] FREE AND LOOSE OBJECT DETECTION SYSTEM

[72] Inventor: Max W. Schulz, Jr., Scotia, N.Y.

[73] Assignee: General Electric Company

[22] Filed: June 29, 1970

[21] Appl. No.: 50,544

[52] U.S. Cl. .................................................73/67
[51] Int. Cl. ..............................................G01h 1/00
[58] Field of Search................73/67, 67.1, 67.2, 71.6

[56] References Cited

UNITED STATES PATENTS

| | | | |
|---|---|---|---|
| 3,191,430 | 6/1965 | Gourley | 73/67 |
| 3,208,268 | 9/1965 | Tallian et al. | 73/67 |

Primary Examiner—Richard C. Queisser
Assistant Examiner—John P. Beauchamp
Attorney—Paul A. Frank, John F. Ahern, Julius J. Zaskalicky, Frank L. Neuhauser, Oscar B. Waddell and Joseph B. Forman

[57] ABSTRACT

Signals due to impacts of loose and free objects are separated and separately processed. A loose object in a device produces pulses synchronized with the vibrations of the device and a free object produces pulses non-synchronous with the vibrations of the device. Loose object pulses are gated into a first channel and rejected from a second channel by gating pulses synchronous with the vibrations. Free object pulses are gated into the second channel by gating pulses synchronous with the vibrations.

7 Claims, 14 Drawing Figures

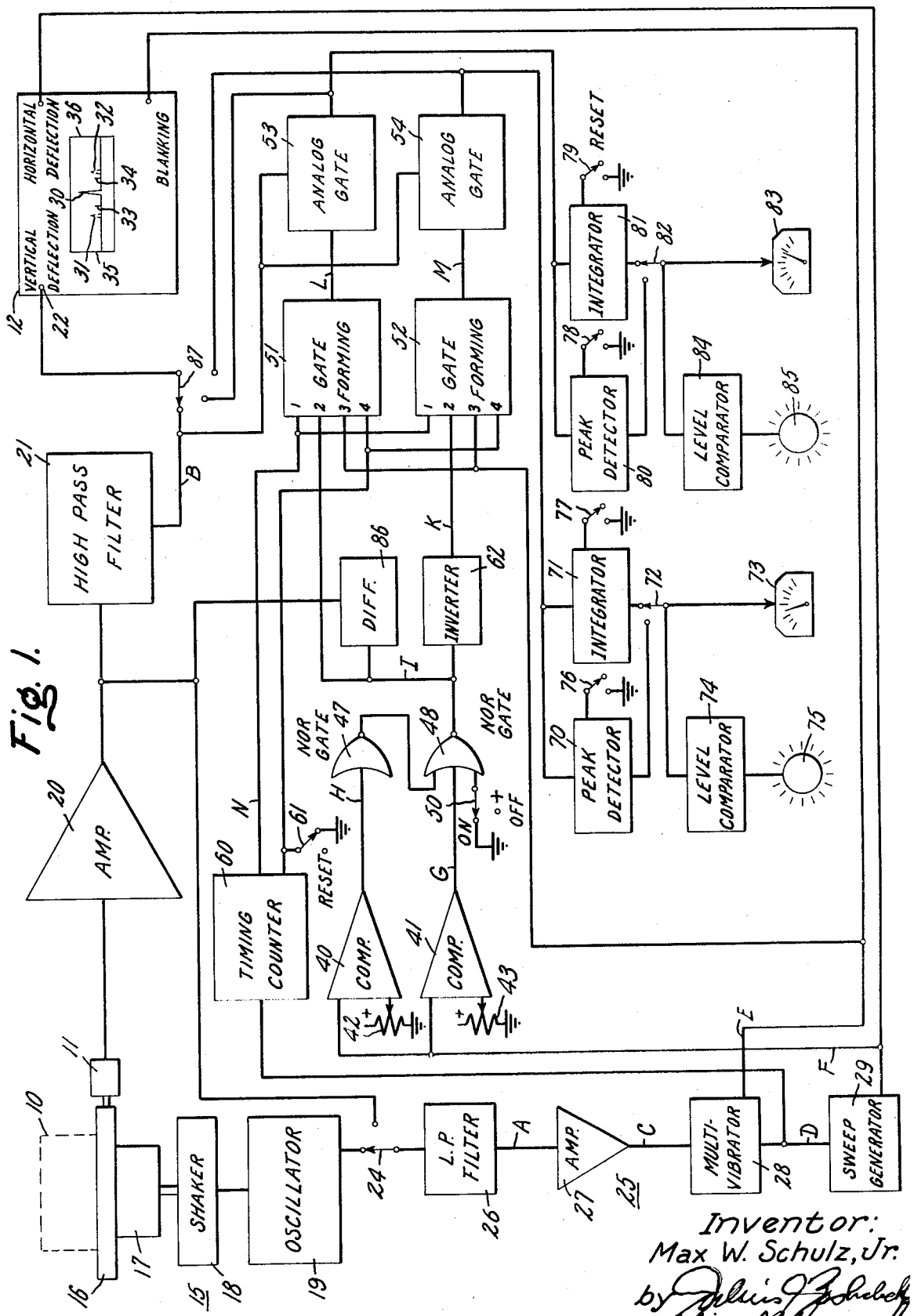

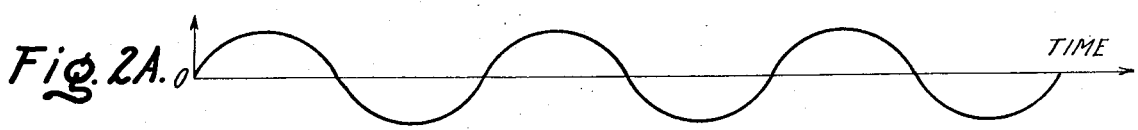
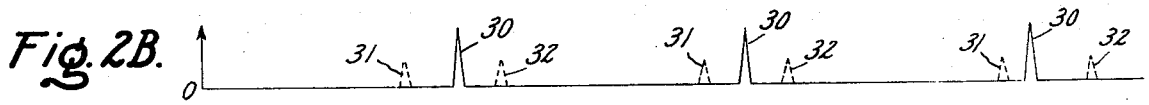
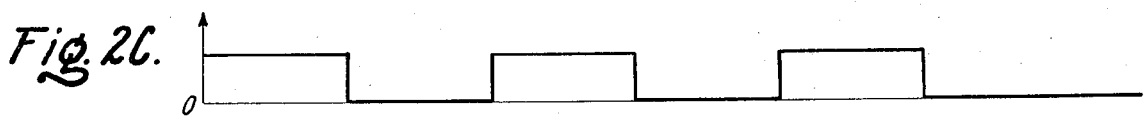
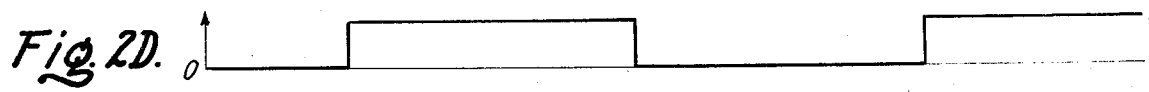
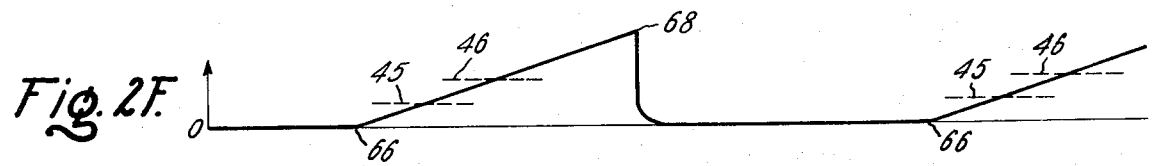
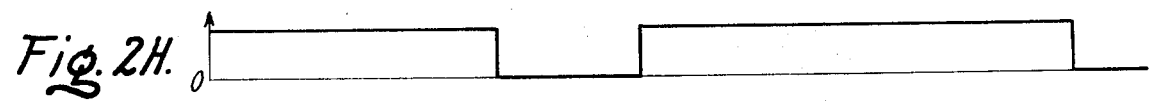
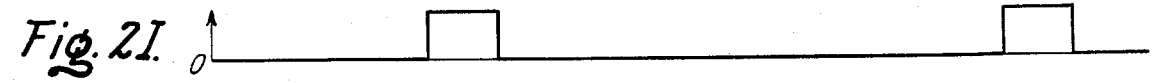
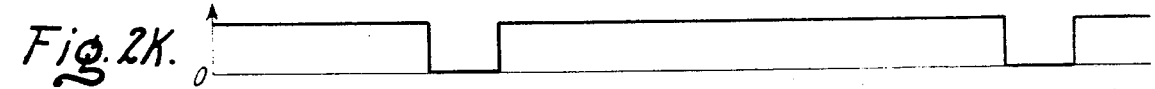
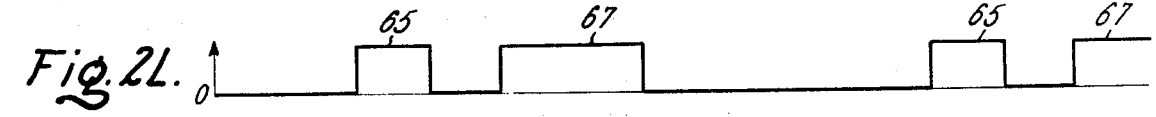
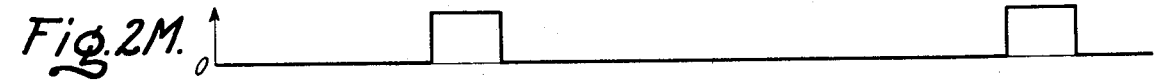

FREE AND LOOSE OBJECT DETECTION SYSTEM

The present invention relates in general to systems for separating signals of different characteristics in a composite signal and in particular relates to circuits for use in a system for the detection and automatic differentiation of free and loose objects in an assembly.

The present invention represents improvements in a free and loose object detection system disclosed and claimed in a copending patent application Ser. No. 619,444, filed Feb. 28, 1967, now U.S. Pat. No. 3,534,589, and assigned to the assignee of the present invention. In that patent application a device to be tested such as an electronic package, electric lamp, or the like, is mounted on a vibration exciter which in turn is driven by a power oscillator. Free objects or particles such as small bits of wire, glass chips, etc. and loose objects such as loose screws or loose wires produce signals in an accelerometer mechanically coupled to the device as the objects hit the enclosure or the internal parts of the device. The signals are amplified, passed through a filter and applied to the vertical deflection plates of an oscilloscope. The filter removes the low frequency vibration signals produced by the vibration exciter. The horizontal sweep of the oscilloscope is synchronized with the vibration of the device by a signal from the power oscillator or by a signal from the accelerometer. Impacts from a loose object tend to occur at the same point in each vibration cycle and thus produce a stationary pattern on such display. The impacts from a free object are produced in a variable pattern on the oscilloscope varying in amplitude and position of occurrence. An experienced operator can readily distinguish a free object or a loose object if either or both are present in a device being tested. However, it is often times necessary to provide apparatus suitable for use by unskilled operators and also it is desirable to provide a means for automatically testing such devices without the presence of an operator. The present invention is particularly directed to apparatus for achieving these objectives.

An object of the present invention is to provide improvements in apparatus for the detection of the presence of free or loose objects in a device.

Another object of the present invention is to provide simple, reliable apparatus for automatically indicating the presence of free or loose objects in a device.

In accordance with an illustrative embodiment of the present invention there is provided means for producing vibrations of a predetermined frequency in a device whereby free and loose objects produce impacts on the device. A transducer is mechanically coupled to the device for sensing vibrations produced by the impacts and for developing electrical signals in accordance with the impacts. A loose object produces a signal including pulses synchronized with the vibrations of the device and each pulse occurring in a predetermined time relationship to a reference phase of the vibrations. Free objects appear as pulses non-synchronous with the predetermined frequency. Means are provided for producing a first gating pulse synchronized with the vibrations and encompassing in time the occurrence of the impact of the loose object. Means are provided for producing a second gating pulse and a third gating pulse. The second gating pulse occurs in synchronism with the vibrations and leads in time the occurrence of the first gating pulse. The third gating pulse is synchronized with the vibration and lags in time of occurrence of the first gating pulse. A pair of switching channels are provided each having a common signal input circuit and separate signal output circuits. The first of the switching channels is responsive to the first gating pulse for passing signals therethrough during the occurrence of the first gating pulse. The second switching channel is responsive to the second and third gating pulses for passing signals therethrough during the occurrence of the second and third gating pulses. Means are provided for applying the signal from the transducer to the channels, whereby in the output of the first channel appears a signal produced by the presence of a loose object in the device and at the output of the second switching channel appears a signal produced by the presence of a free object in the device.

The novel features which are believed to be characteristic of the present invention are set forth in the appended claims.

The invention, itself, together with further objects and advantages thereof may best be understood by reference to the following description, taken in connection with the accompanying drawings wherein:

FIG. 1 is a block diagram showing the system of the present invention;

FIG. 2A–FIG. 2N is a series of diagrams of waveforms correspondingly designated appearing at various points in the system of FIG. 1.

Referring now to FIG. 1, there is shown a block diagram of a system in which an assembly or device 10 in which it is desired to detect loose and free objects is vibrated, in which the vibrations produced in the device are sensed by an accelerometer 11 and displayed on an oscilloscope 12, and in which signals corresponding to loose objects are separated from signals corresponding to free objects. Such signals may be separately displayed and further operations such as peak detection and integration may be performed thereon to provide further information in connection with the condition of the device. The portion of the system including the vibrating or shaker apparatus, the vibration sensing apparatus and the display apparatus is disclosed in the aforementioned patent application. The sawtooth wave generation circuits for providing sweep along the horizontal coordinate of the oscilloscope is described and claimed in a copending patent application Ser. No. 50,543, filed June 29, 1970 and assigned to the assignee of the present invention.

The system includes a shaker apparatus 15 including a mounting plate 16 which is adapted to hold test device 10. The mounting plate is supported by an isolation structure 17 which may be of rubber, for example, which passes frequencies used for vibrating the test device but which does not pass higher frequencies of vibration. The isolation structure in turn is connected to an electromechanical vibrator referred to as a shaker 18. Shaker 18 is driven by a power oscillator 19. Attached to one side of the plate is a transducer 11, such as an accelerometer. The accelerometer 11 picks up vibrations imparted to the plate 16 such as caused by free and loose particles and objects impacting on the device 10 as the result of the vibrations to which it is subjected. The output from the accelerometer 11 is passed through a signal channel which includes an amplifier 20 and a high pass filter 21, the output of which is applied to the vertical deflection input 22 of the oscilloscope 12 to provide deflection along the vertical coordinate thereof. Deflection along the horizontal coordinate of the oscilloscope is provided by a sawtooth voltage from the sweep channel 25 of the system.

The sweep channel includes a low pass filter 26, the input of which may be connected either to the oscillator 19 or to the output of the amplifier 20 in the signal channel through switch 24. The output of the low pass filter 26 is supplied to an amplifier 27 which is driven between saturation and cutoff to produce a square wave at the output thereof. The output of the amplifier 27 is applied to the input of the multivibrator 28 or square wave generator which provides at the output thereof a pair of square wave outputs having twice the period of the square wave applied to the input thereof. One of the outputs of the multivibrator 28 is oppositely phased to the other output. One of the outputs is applied to the sweep generator 29 which generates a sweep voltage synchronized therewith. The other square wave output is supplied to the blanking terminal of the oscilloscope 12 to provide blanking of the return trace of the electron beam of the oscilloscope. The sweep generation channel 25 is described and claimed in the aforementioned copending application Ser. No. 50,543. The waveform A of the signal appearing at the output of the low pass filter 26 is shown in FIG. 2A. The output C of the amplifier 27 is shown in FIG. 2C. One output D of the square wave generator 28 is shown in FIG. 2D. The other output E of the square wave generator used for return trace blanking is shown in FIG. 2E. The sawtooth output F of the sweep generator 29 is shown in FIG. 2F.

The signal B picked up by the accelerometer 11 and applied to the vertical deflection plates of the oscilloscope is shown in FIG. 2B. In this figure is shown a series of pulses, the solid pulses 30 representing the vibrations produced by impacts of loose objects in the device. Loose objects produce impacts which have the same frequency as the vibrations which caused the loose objects to produce the impacts. Accordingly, they are synchronized and occur at regular intervals in respect to the frequency of the vibration wave. Free particles or objects on the other hand not being tied down to the assembly will impact on the device non-synchronously, the impacts depending upon their location, their mass, etc. Accordingly, such impacts are collectively represented by the dotted pulses 31 and 32, one on each side of the solid pulse 30. Such dotted pulses are shown in varying positions with respect to the solid pulse along the time axis of the graph of FIG. 2B to indicate their non-synchronous characteristics. On the screen of the oscilloscope 12 of FIG. 1 the solid pulse 30 and a pair of dotted pulses 31 and 32 are shown corresponding, respectively, to the solid and dotted pulses of FIG. 2B. Also shown on the screen are a pair of vertical lines 33 and 34 spaced, one on the left side of the solid pulse 30 and the other on the right side of the solid pulse 30, respectively. The portion of the display between the marker lines 33 and 34 is referred to as the inside window and the remaining portions of the display, that is the portions between the left hand edge 35 and the marker 33 and between the marker 34 and the right hand edge 36 are referred to as the outside windows.

Gating circuits to be described below respond to inputs from the sweep generation channel 25 and function to develop gating pulses to control the passage of signals representing impacts from the signal channel through a pair of signal processing channels represented by a pair of analog gates to separate a portion of the signals occurring during the time corresponding to the inside window from the signals occurring during the time corresponding to the outside windows. Signals from each of the processing channels are then passed to signal processing circuits for providing indications of such characteristics as sum and peak values of pulses in the respective separated signals. The manner of achieving such separation will now be explained.

The output F of the sweep generator 29, shown in FIG. 2F, is applied to an input terminal of a pair of comparators 40 and 41. Comparators 40 and 41 are differential amplifiers and provide an output depending upon the values of a pair of inputs. Another input terminal of the comparator 40 is connected to a bias source collectively designated by the potentiometer 42 and similarly the other input terminal of the comparator 41 is connected to a bias source 43. The bias level of the aforementioned other input terminal of the comparator 41 is represented by the level 45 on FIG. 2F and the bias applied to the other aforementioned input terminal of the comparator 40 is indicated by the level 46 of FIG. 2F, a level which is greater in amplitude and later occurring than level 45. When the amplitude level of the sawtooth wave F exceeds the level 45, the output G of the comparator 41 shown in FIG. 2G drops from a positive value to a zero value and remains at a zero value until the amplitude level of the sawtooth wave drops below the level 45 at which time the output of the comparator 40 returns to a positive value. Similarly, when the level of the sawtooth wave exceeds the level 46 the output H of the comparator 40 shown in FIG. 2H drops to zero and remains zero until the level of the sawtooth wave drops to zero as shown in FIG. 2H. The output of the comparator 40 is applied to a NOR gate 47, the output of which in turn is applied to the input of another NOR gate 48. Also applied to the input of the NOR gate 48 is the output of comparator 41. A further input is applied to the NOR gate which may be either a zero voltage or a positive voltage depending upon the position of the switch 50. When the switch 50 is in the position indicated, that is connecting the input to ground the NOR gate 48 is "on", i.e. it will pass control pulses. The combination of gates 47 and 48 functions to produce an output at the NOR gate 48 which is positive when all of the inputs to the NOR gate 48 are zero. The NOR gate 47 reverses the phase of the signal H so that its input to the NOR gate is opposite to that shown in FIG. 2H. Accordingly, with the switch in the zero or ground reference position, a positive output I is produced at the output of NOR gate 48 shown in FIG. 2I.

A pair of gate forming circuits 51 and 52 are provided responsive to the output of the NOR gate 48 as well as other inputs to be described below to provide a pair of outputs L and M shown in FIGS. 2L and 2M, respectively, which are utilized for gating a pair of analog amplifiers 53 and 54. The analog gate 54 controlled by waveform M passes signals occurring in the time interval represented by the spacing of the vertical markers 33 and 34 on the oscilloscope display. The analog gate 53 controlled by waveform L passes signals corresponding to the time interval represented by the output windows, that is, the signals occurring in the time intervals between the left hand edge 35 of the display and the marker 33 and between the marker 34 and the right hand edge 36 of the display. The gate forming circuit 51 has four input terminals designated 1, 2, 3 and 4 and provides a positive output when all of the inputs to the gate are zero. To terminal 1 of gate forming circuit 51 is provided a timing wave N shown in FIG. 2N from the output of the timing counter 60, the input of which is connected to the square wave generator or multivibrator 28. The timing wave N has a duration corresponding to a predetermined number of cycles of vibration over which it is desired to have the apparatus function, several hundred cycles, for example. To terminal 2 of gate forming circuit 51 is applied the output I of the NOR gate 48. To terminal 3 of the gate forming circuit 51 is applied the blanking signal E from the square wave generator 28 and to terminal 4 is applied a reset pulse from switch 61 which is used for inhibiting the gate forming circuit 51 concurrently with resetting the timing counter 60. In the resetting operation, a positive pulse is applied to the timing counter 60 and to the gate forming circuit 51 which returns the timing counter to zero count and momentarily disables the circuit 51 so that upon initiation of the counting of the timing counter 60, the circuit 51 is opened to generate an output. Similarly, the first input terminal of the gate forming circuit 52 is connected to the output of the timing counter 60, the second input terminal is connected to an inverter 62 which inverts the waveform I of FIG. 2I to produce the waveform K of FIG. 2K. The third input terminal is connected to the blanking signal output of the multivibrator 28 and the fourth input terminal is connected to the reset switch 61. Accordingly, application of the indicated inputs to the gating circuit 51 and to the gating circuit 52 produces control waveforms L and M as shown in FIGS. 2L and 2M, respectively.

The gating pulse of FIG. 2M includes a leading edge occurring coincident with the attainment of the sawtooth wave of FIG. 2F of the first level 45 as set by the bias control 43 and includes a lagging edge occurring coincident in time with the attainment of the sawtooth wave of the bias level 46 set by the potentiometer 42. In connection with two control pulses of the waveform of FIG. 2L the leading control pulse has a leading edge coincident with the time of initiation 66 of the sweep voltage and a lagging edge coincident with the time of occurrence of the level 45 of the sawtooth wave and the lagging gating pulse 67 has a leading edge coincident with the time of occurrence of the sawtooth wave corresponding to the level 46 and a lagging edge corresponding to the peak value 68 or termination of the sweep voltage.

The output of the analog gate 54 passes signals occurring during the time interval of the inside window, that is, those signals corresponding to the loose part, to a pair of signal processing circuits one of which is a peak detector 70, the other of which is an integrator 71 to provide outputs corresponding to the peak of the signals in the channel and also to the sum of the signals occurring in the channel. The outputs of the peak detector 70 and the integrator 71 may be selectively applied through the switch 72 to a meter 73 which measures the outputs of the circuits 70 and 71 or to a level comparator 74. A reference level of the comparator 74 is preset to provide indication by means of a lamp 75, when the input to the comparator 74 reaches or exceeds a predetermined value corresponding, for example, to a loose part vibration of a particular magnitude.

Similarly, the output of the analog gate 53 passes signals occurring during the time interval of the outside windows, that is, those signals corresponding to the free objects, to a pair of signal processing circuits one of which is a peak detector 80, the other of which is an integrator 81 to provide outputs corresponding to the peak of the signals in the channel and also to the sum of the signals occurring in the channel. The outputs of the peak detector 80 and the integrator 81 may be selectively applied through the switch 82 to a meter 83 which measures the outputs of the circuits 80 and 81 or to a level comparator 84. A reference level in the comparator 84 is preset to provide indication by means of a lamp 85, when the input to the comparator 84 reaches or exceeds a predetermined value corresponding, for example, to free object vibration of a particular magnitude. Each of the peak detectors 70 and 80 and integrators 71 and 81 is provided with a respective reset switch 76, 77, 78 and 79, connecting the units to ground. The reset switches function in conjunction with reset switch 61 to reset the units to zero when initiating a measurement.

To provide the vertical markers 33 and 34 on the screen of the oscilloscope 12 representing the edges of the inside window, the output I of the NOR gate 48 is differentiated by the differentiator 86 to provide a pair of short pulses corresponding to the leading and lagging edges of the pulse of waveform I. The pairs of pulses are applied to the signal channel at the input of the high pass filter 21.

The operation of the system of FIG. 1 will now be explained in connection with the waveform diagrams of FIGS. 2A through 2I, and FIGS. 2K through 2N. It is assumed that the device or assembly which is being vibrated has a loose part and a pair of free objects. The switch 24 connects the sweep channel 25 with the oscillator 19. The three position switch 87 is set so as to pass the output of the high pass filter 21 in the signal channel to the vertical deflection plates of the oscilloscope 12. Also, the switch 50 is set so that the NOR gate 48 is operative to provide inputs to the gate forming circuits 51 and 52. The reset switch 61 is momentarily actuated to set the timing counter 60 to develop the waveform of FIG. 2N at the initiation of the first sweep after release of the reset switch 61. Concurrently, reset switches 76, 77, 78 and 79 are actuated. The application of the sawtooth wave of FIG. 2F to the horizontal deflection plates of the oscilloscope produces the display shown on the oscilloscope screen, that is, a pulse 30 corresponding to a loose object and a pair of pulses 31 and 32 corresponding to a pair of free objects. The potentiometer 43 connected to an input of comparator 41 sets the position of the first marker 33 along the horizontal axis adjacent the leading edge of pulse 30 and the potentiometer 42 connected to an input of the comparator 40 sets the position of the other marker 34 adjacent the lagging edge of the pulse 30. Such settings of the potentiometers 42 and 43 set up the gating circuits including gates 47 and 48 and the gate forming circuits 51 and 52 to operate the analog gates 53 and 54 to become operative to pass signals during appropriate time interval during each sweep period and for a predetermined number of sweep periods as set by the timing counter 60.

The analog gate 53 passes signals applied to the input thereof during the intervals lying between the initiation of sweep at edge 35 and the leading marker line 33 and also between the lagging marker line 35 and the peak or termination of the sweep at edge 36. The analog gate 54 passes signals occurring during the time interval between the leading marker 33 corresponding to level 45 of FIG. 2F and lagging marker 34 corresponding to level 46. Peak detector 80 and the integrator 81 in the outside window channel, that is, connected to the analog gate 53 derive a peak reading and a sum reading, respectively, of the signals occurring in the outside window over the predetermined number of cycles set by the timing counter 60. With the selector switch 82 in the sum position as indicated, the meter 83 connected thereto would provide an indication of the sum of the signals and the level comparator 84 would provide an indication by the lamp 85 at the output thereof of the attainment of the sum of a predetermined level to which the comparator 84 is set. The level comparator 84 is similar to the comparators 40 and 41. Of course, should a peak reading be desired and a response to a certain peak level be desired, the selector switch 82 would be switched to the peak detector position. Similarly, peak detector 70 and integrator 71 in the inside window channel, that is, connected to analog gate 54 derives a peak reading and a sum reading respectively of signals occurring in the inside window over a predetermined number of cycles set by the timing counter 60. With the selector switch 72 in the sum position, the meter 73 connected thereto would provide an indication of the sum of the signals and the level comparator 74 would provide an indication by the lamp 85 at the output thereof of the attainment of the sum of a predetermined level to which the comparator 74 is set. The level comparator 74 is similar to level comparators 40 and 41. Of course, should a peak reading be desired and a response to a certain peak level be desired, the selector switch 82 would be switched to the peak position. While analog gate 54 passes pulses produced by loose objects, some pulses due to free objects will also be passed on random basis. However, as such pulses would occur rather infrequently, they would not appreciably affect the sum and peak readings in that channel.

Switch 87 has in addition to the signal channel position, a second position which enables monitoring of the signals occurring in the outside windows solely, i.e., from analog gate 53, and a third position for monitoring and displaying on the screen of the oscilloscope signals corresponding to the output of the inside window channel, i.e., from analog gate 54. Also, should it be desired to provide a peak reading and an integrated reading of the entire or composite signal from the accelerometer, the switch 50 is switched to the OFF position which disables the NOR gate 48 and puts the gating circuits under the control of the timing counter 60 and the blanking pulse from multivibrator 28. Accordingly, at the output of the analog gate 53 appears the signal appearing in the signal channel. The peak detector 80 and integrator 81 could be utilized for peak and sum readings of the composite signal as picked up by the accelerometer.

While the invention has been described in a specific embodiment, it will be appreciated that modifications may be made by those skilled in the art and I intend by the appended claims to cover all such modifications as fall within the true spirit and scope of the invention.

What I claim as new and desire to secure by Letters Patent of the United States is:

1. An apparatus for detecting and differentiating between free and loose objects in an assembly comprising means for producing vibrations of a predetermined frequency in said assembly whereby free and loose objects produce impacts on said assembly, a transducer mechanically coupled to said assembly for sensing vibrations produced by said impacts and for developing electrical signals in accordance with said impacts, a loose object producing a signal including pulses synchronized with the vibrations of the assembly and each pulse occurring in a predetermined time relationship to a reference phase of the vibration, and free objects appearing as pulses nonsynchronous with said predetermined frequency, means for producing a first gating pulse synchronized with said vibrations and encompassing in time the occurrence of the impact of said loose object, means for producing a second gating pulse and a third gating pulse, said second gating pulse occurring in synchronism with said vibrations and leading in time the occurrence of said first gating pulse, said third gating pulse synchronized with said vibration and lagging in time of occurrence of said first gating pulse, a pair of switching channels each having a common signal input circuit and separate signal output circuits, the first of said switching channels responsive to said first gating pulse for passing signals therethrough during the occurrence of said first gating pulse, and second of said switching channels responsive to said second and third gating pulses for passing signals therethrough during the occurrence of said second and third gating pulses, means for applying the signal from said transducer to said channels, whereby at the output of said first channel appears a signal produced by the presence of a loose object in said assembly and at the output of said second switching channel appears a signal produced by the presence of free objects in said assembly.

2. The combination of claim 1 in which the leading edge of said first gating pulse coincides with the lagging edge of said second gating pulse and the lagging edge of said first gating pulse coincides with the leading edge of said third gating pulse.

3. The combination of claim 1 in which is provided first indication means responsive to signals in said first channel to provide an indication of the presence of loose objects and second indication means responsive to signals in said second channel to provide indication of the presence of free objects.

4. The combination of claim 2 in which said first indication means and said second indication means individually include indicators for indicating a level of signal above a predetermined level.

5. Apparatus for detecting and differentiating between free and loose objects in a device comprising
   means for producing vibrations of a predetermined frequency in said device whereby movable objects produce impacts on said device,
   a transducer mechanically coupled to said device for sensing vibration produced by said impacts and for developing electrical signals in accordance with said impacts, a loose object producing a signal including pulses synchronized with the vibrations of the device and each pulse occurring in a predetermined time relationship to a reference phase of the vibration producing means, and free objects appearing as pulses non-synchronous with said predetermined frequency,
   means for producing a sawtooth wave synchronized with said predetermined frequency,
   means responsive to a first occurring level of amplitude of said sawtooth wave and to a second occurring level of amplitude of said sawtooth wave for producing a first gating pulse having a leading edge corresponding to the first occurring level and having a lagging edge corresponding to the second occurring level, said first level and said second level separated by an interval which encompasses the occurrence of said pulse corresponding to a loose object,
   means responsive to a timing pulse having a leading edge coincident with the starting point of said sawtooth wave and a lagging edge corresponding to the peak level of said sawtooth wave and to said first gating pulse to produce a second and a third gating pulse, said second gating pulse having a leading edge coincident with said starting point and the lagging edge coincident with said first occurring level of said sawtooth wave, said third gating pulse having a leading edge coincident with the second occurring level and the lagging edge coincident with the peak level of said sawtooth wave,
   a first switching channel responsive to said first gating pulse for passing pulses occurring during said interval and for rejecting other pulses,
   a second switching channel responsive to said second and third gating pulses for passing signals including pulses lying outside of said interval and representing pulses non-synchronous with said vibrations and for rejecting other signals,
   means for applying said signal from said transducer to said channels whereby at the output of said first channel appear signals corresponding to a loose object and at the output of said second channel appear signals corresponding to free objects.

6. The combination of claim 5 in which an oscilloscope is provided for displaying said signals,
   means for applying the output of said channels to one coordinate of said oscilloscope,
   means for synchronizing the other coordinate of said oscilloscope with said predetermined frequency whereby loose objects appear on said oscilloscope as pulses relatively fixed in position along said other coordinate and free objects appear as pulses non-synchronous with said predetermined frequency, and said first and second levels are represented as lines along said other coordinate, the distance between which encompasses said interval.

7. The combination of claim 5 in which said channels are operated for a time period encompassing a predetermined number of cycles of vibration.

* * * * *